July 15, 1958     H. D. FINLEY     2,843,287
FOOD RECEPTACLE
Filed Sept. 7, 1954
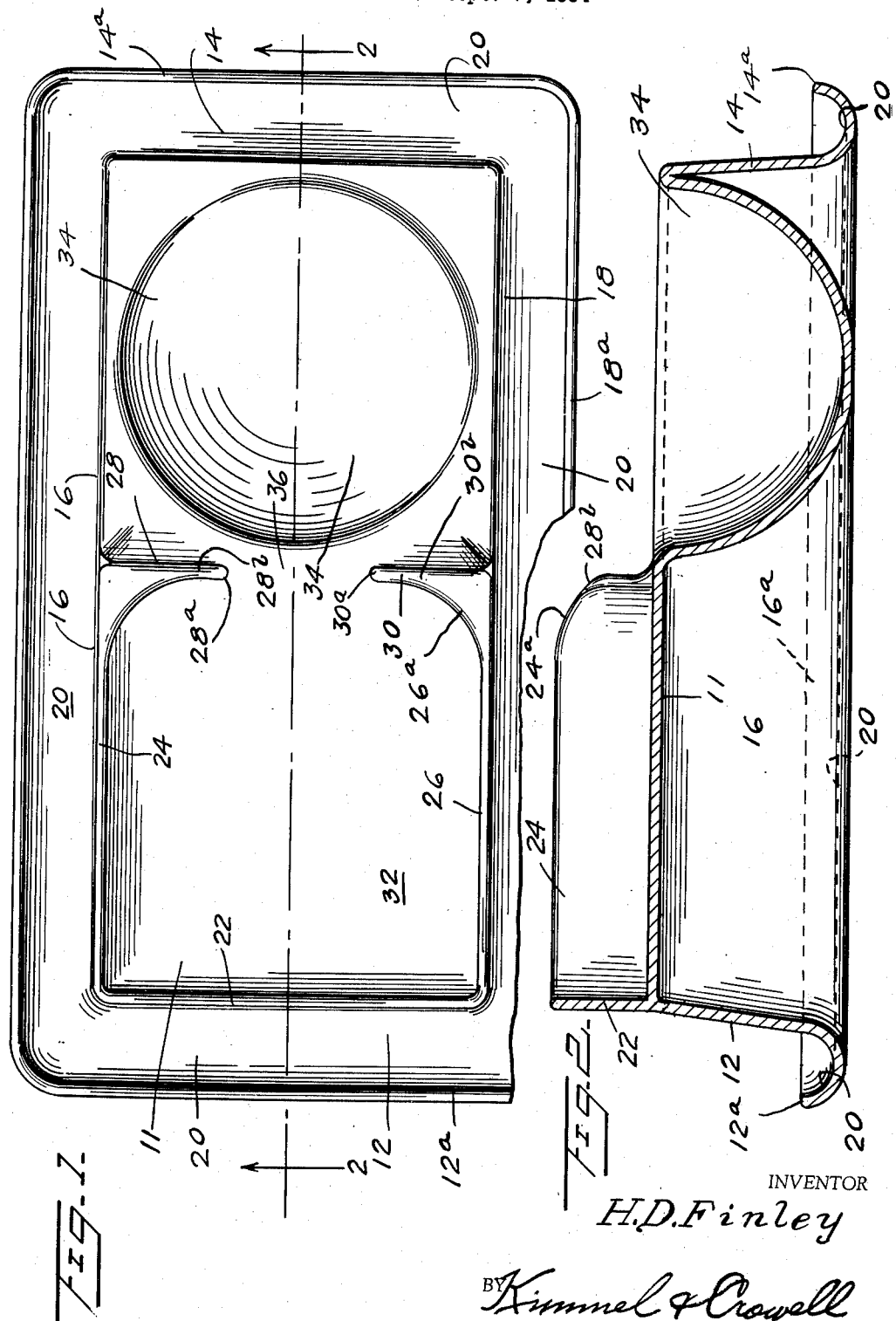
INVENTOR
*H.D.Finley*
BY *Kimmel & Crowell*
ATTORNEYS

United States Patent Office 2,843,287
Patented July 15, 1958

2,843,287

FOOD RECEPTACLE

Harold D. Finley, Biltmore Forest, N. C.

Application September 7, 1954, Serial No. 454,444

1 Claim. (Cl. 220—20)

This invention relates to a food receptacle, and more specifically to a breakfast food dish.

It is common knowledge to those individuals who enjoy dry cereals, such as "Corn Flakes," "Puffed Rice," "Grape Nut Flakes" and other nationally known similar food products, that when the cereal is placed in a breakfast dish and the milk or cream is added thereto, the first few spoonfuls taken therefrom taste exceptionally good because the cereal is crisp. Subsequent spoonfuls are less tasty since the cereal has become saturated and soggy in the milk or cream.

Consequently, the present invention has, as one of its primary objects, the provision of a compartmentalized cereal dish wherein the cereal and milk or cream are held separate from each other.

A further object of this invention is to provide in a dish of the type described, means for transferring the cereal from its compartment to the compartment holding the milk or cream.

Another object of this invention is to provide means in a cereal dish, of the type to which reference has been made, for trapping and retaining any of the milk, cream or cereal which may be inadvertently spilled over the walls of their respective compartments.

Other and further objects and advantages of this invention will become more apparent from a consideration of the following specification when read in conjunction with the annexed drawing, in which:

Figure 1 is a top plan view of a cereal dish constructed in accordance with this invention.

Figure 2 is a longitudinal cross-sectional view taken on the vertical plane of line 2—2 of Figure 1, looking in the direction of the arrows.

Referring now more specifically to the drawing, reference numeral 10 designates, in general, a cereal dish constructed in accordance with the teachings of this invention. The dish 10 may be constructed of glass, plastic, porcelain, or other ceramic materials and comprises an elongated substantially rectangular upper wall 11 normally disposed in a horizontal position. The upper wall 11 is supported on a table or base (not shown) by integrally formed depending end flanges 12, 14 and side flanges 16, 18. The end and side flanges 12, 14 and 16, 18, respectively, flare downwardly and outwardly from the top wall 11 and terminate in outwardly curved ends 12a, 14a, 16a and 18a to form a continuous trough 20.

The cereal compartment is defined by an integrally formed end wall 22 which projects upwardly from the base 10 and is joined at each end thereof by integrally formed side walls 24, 26 which extend inwardly therefrom in spaced substantially parallel relation. The inner ends of the side walls 24, 26 integrally connect with one end, respectively, of a pair of inwardly extending side walls 28, 30. As is seen in Figure 1, the inner ends 28a, 30a of the pair of side walls are in spaced confronting relation, and the corners formed within their junction with the side walls 24, 26 are arcuately shaped. It should also be noted that the upper edges of the inner ends of the side walls 24, 26 and the pair of end walls 28, 30 curve downwardly at 24a, 26a and 28b, 30b, toward the confronting ends 28a, 30a.

The end wall 22, side walls 24, 26, and the spaced pair of end walls 28 and 30 form a substantially rectangular food compartment 32 for dry cereals.

The other end of the upper wall 11 is provided with a substantially semi-spherical depression 34 forming a compartment to receive milk or cream.

To utilize this dish, cereal is placed in the compartment 32 and milk or cream is placed in the compartment 34. Thereafter, and as desired, the user pushes the cereal from the compartment 32 into the compartment 34 through the passage 36 formed by the confronting ends 28a, 30a of the pair of end walls 28, 30.

In the event the cereal or liquid is inadvertently spilled from their respective compartments it will fall into the trough 20.

Having described and illustrated one embodiment of this invention in detail, it will be understood that the same is offered merely by way of example, and that the invention is to be limited only by the scope of the append claim.

What is claimed is:

A compartmented cereal dish comprising an upper horizontal rectangular wall, a pair of spaced apart side walls depending from opposite sides of said upper wall, a pair of spaced apart end walls depending from opposite ends of said upper wall and having their opposite ends respectively integrally joined to the opposite ends of said side walls, said side walls and said end walls each sloping downwardly and outwardly, a continuous horizontal trough formed integrally with the lower outer portions of said side and end walls, said horizontal upper wall having a deep recess formed in one end portion thereof, an end flange extending integrally upwardly from the end of said upper wall opposite said deep recess, a pair of oppositely disposed upwardly projecting side flanges on opposite side edges of said upper wall extending from said end flange to a point intermediate the ends of said upper wall, and short flanges forming a partial partition between the end portion of said upper wall having said deep recess and the remaining portion of said upper wall.

References Cited in the file of this patent

UNITED STATES PATENTS

| | | |
|---|---|---|
| D. 88,285 | Blenker | Nov. 15, 1932 |
| D. 117,898 | Carawan | Dec. 5, 1939 |
| 75,555 | Lilley | Mar. 17, 1868 |
| 126,253 | Bernard | Apr. 30, 1872 |
| 876,808 | Kinert | Jan. 14, 1908 |
| 1,272,996 | Poschadel | July 16, 1918 |
| 1,520,402 | Clemans | Dec. 23, 1924 |
| 1,756,963 | Ware | May 6, 1930 |
| 2,199,195 | Crimmel | Apr. 30, 1940 |
| 2,474,995 | Wade | July 5, 1949 |
| 2,677,350 | Prestidge | May 4, 1954 |

FOREIGN PATENTS

| | | |
|---|---|---|
| 4,485 | Great Britain | Apr. 11, 1885 |
| 117,379 | Great Britain | July 18, 1918 |
| 382,879 | Great Britain | Nov. 3, 1932 |